J. Gault.
Setting Vault Covers.
Nº 2,476.
33,480.
Patented Oct. 15, 1861.
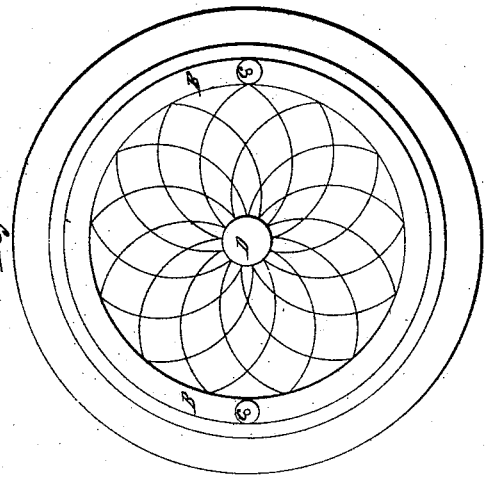
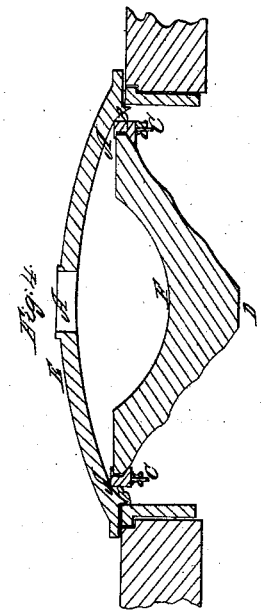
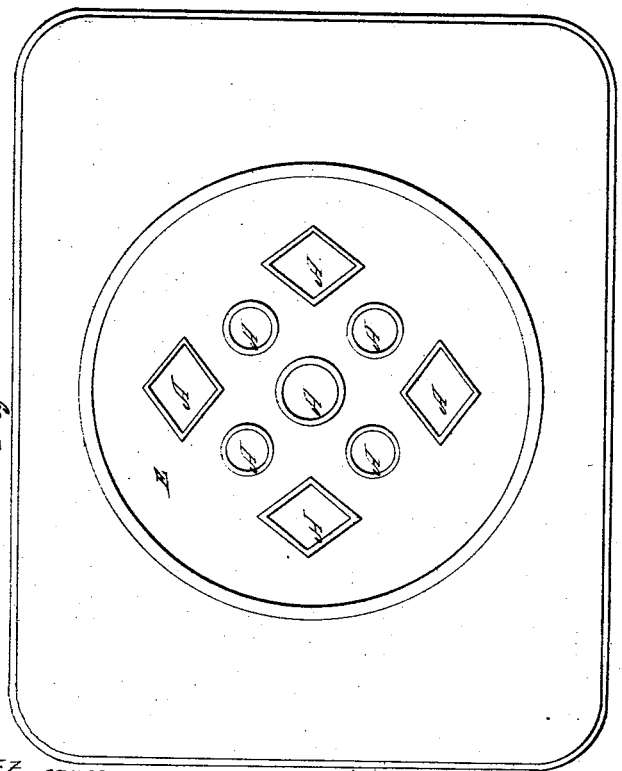
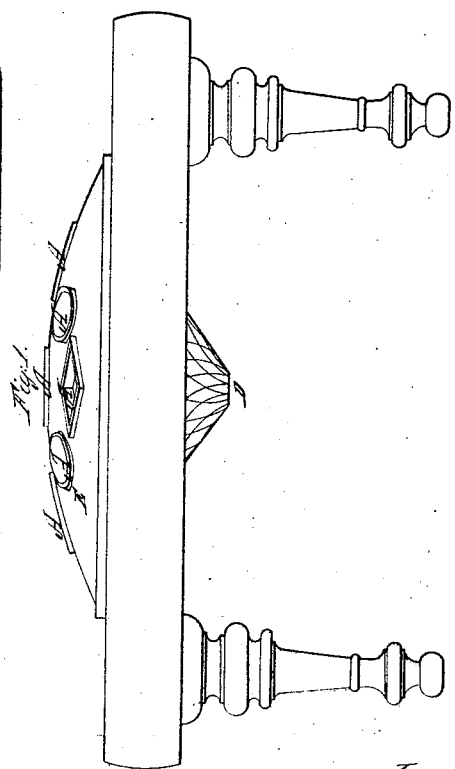
Witnesses:
T. J. Gordon
Geo. H. Collins
Inventor:
John Gault

UNITED STATES PATENT OFFICE.

JOHN GAULT, OF BOSTON, MASSACHUSETTS.

IMPROVEMENT IN SETTING VAULT-LIGHTS.

Specification forming part of Letters Patent No. 33,480, dated October 15, 1861.

*To all whom it may concern:*

Be it known that I, JOHN GAULT, of Boston, Suffolk county, Massachusetts, have invented a new and useful Improvement in Vault-Lights; and I hereby declare that the following is a full and exact description thereof, reference being had to the accompanying drawings, and to the letters of reference marked thereon, the same letters being used to represent the same thing in each figure.

My improvements consists in the method of attaching an adjustable glass beneath metallic vault-covers.

Some advantages of my improvement are a less number of openings for the admission of light will be required through the vault-cover than in the mode adopted by former inventors, a great saving in expense by avoiding the necessity of carefully inserting and water-tight fitting numerous pieces of glass into the metallic cover, it can always be readily cleaned, and the glass is not liable to fracture or injury in its capacity to transmit light by travel over it or placing weights upon it as when the glass is set in the metallic cover.

To enable others to make and use my invention, I will describe its construction and operation.

I employ any of the metallic vault-covers now in use having a number of openings of convenient size adapted to the amount of light required, as shown by letters A A A, Figures 1 and 2. I secure the prismatic glass cone, which is concave on its upper surface in a suitable metallic rim, as shown by letters B B, Fig. 3. The metallic rim is secured to the under side of the metallic cover by screws and nuts, as shown by letters C C, Fig. 4, or by an ordinary hinge and catch on the opposite side to facilitate its ready removal for cleaning.

Fig. 1 is a side view of my improved vault light and cover in position. Fig. 2 is a top view of a perforated metallic vault-cover, showing the openings A A A for admission of light. Fig. 3 represents the prismatic diamond cut-glass cone D inverted, secured within the metallic rim B B, which rim is secured to the bottom of the metallic cover E by the screws and nuts C C. Fig. 4 is a vertical sectional view of my improved vault-light when in place cut through the center.

The operation will be as follows: The light-covering through the openings A A A in the cover E will be concentrated by the concave surface F of the glass prismatic cone D and disseminated by the prisms, into which the under surface of the glass cone D is cut.

I do not claim the peculiar form of glass, nor the shape in which it is cut, nor the perforated metallic vault-cover; but

What I claim as my improvement, and desire to secure by Letters Patent, is—

1. Placing an adjustable glass below a vault-cover and detached therefrom for the transmission of light.

2. The combination of a perforated metallic vault-cover with a glass beneath it, so arranged that the latter may be attached or removed in whole or in part at will.

JOHN GAULT.

Witnesses:
 S. J. GORDON,
 GEO. H. COLLINS.